(12) United States Patent
Chu

(10) Patent No.: US 7,969,606 B2
(45) Date of Patent: Jun. 28, 2011

(54) METHOD AND SYSTEM FOR DISTRIBUTING CONSUMER PHOTOGRAPH-BASED ADVERTISEMENT AND/OR INFORMATION

(75) Inventor: Yu-Chung Chu, Great Falls, VA (US)

(73) Assignee: Yu-Chung Chu, Great Falls, VA (US)

( * ) Notice: Subject to any disclaimer, the term of this patent is extended or adjusted under 35 U.S.C. 154(b) by 1306 days.

(21) Appl. No.: 11/490,064

(22) Filed: Jul. 21, 2006

(65) Prior Publication Data

US 2007/0019261 A1 Jan. 25, 2007

Related U.S. Application Data

(60) Provisional application No. 60/701,147, filed on Jul. 21, 2005.

(51) Int. Cl.
*G06F 3/12* (2006.01)
*G06K 15/00* (2006.01)
*H04N 1/46* (2006.01)
*H04N 1/387* (2006.01)

(52) U.S. Cl. ...... 358/1.17; 358/1.1; 358/1.15; 358/1.18; 358/540; 358/450; 358/302

(58) Field of Classification Search .................. 358/540, 358/302, 1.15, 1.18, 450, 1.1, 1.17
See application file for complete search history.

(56) References Cited

U.S. PATENT DOCUMENTS

| | | | | |
|---|---|---|---|---|
| 5,933,811 A * | 8/1999 | Angles et al. | ............. | 705/14.56 |
| 5,978,560 A * | 11/1999 | Tan et al. | ............. | 358/1.15 |
| 6,134,018 A * | 10/2000 | Dziesietnik et al. | ......... | 358/1.15 |
| 6,914,694 B1 * | 7/2005 | Ichikawa et al. | ............. | 358/1.15 |
| 6,917,440 B2 * | 7/2005 | Kondo et al. | ............. | 358/1.15 |
| 6,965,447 B2 * | 11/2005 | Satake et al. | ............. | 358/1.15 |
| 6,974,268 B2 * | 12/2005 | Inoue | ............. | 400/76 |
| 7,038,807 B1 * | 5/2006 | Karres | ............. | 358/1.18 |
| 7,136,177 B1 * | 11/2006 | Bryan et al. | ............. | 358/1.15 |
| 7,136,178 B1 * | 11/2006 | Gupta et al. | ............. | 358/1.15 |
| 7,375,838 B2 * | 5/2008 | Moneypenny et al. | ...... | 358/1.15 |
| 7,461,138 B2 * | 12/2008 | Mukaiyama et al. | ......... | 709/219 |
| 7,536,306 B2 * | 5/2009 | Ogawa | ............. | 705/1 |
| 2003/0233425 A1 | 12/2003 | Lyons et al. | | |
| 2004/0001219 A1 | 1/2004 | Wen et al. | | |
| 2004/0158488 A1 | 8/2004 | Johnson | | |
| 2004/0263907 A1 * | 12/2004 | Hiraki | ............. | 358/1.18 |
| 2005/0081154 A1 | 4/2005 | Vogel | | |
| 2005/0099657 A1 * | 5/2005 | Hudetz | ............. | 358/1.18 |
| 2009/0059284 A1 * | 3/2009 | Kitagata | ............. | 358/1.15 |

OTHER PUBLICATIONS

International Search Report.

\* cited by examiner

*Primary Examiner* — Charlotte M Baker
(74) *Attorney, Agent, or Firm* — Andrews Kurth LLP

(57) ABSTRACT

An automatic advertisement system creates and processes a digital image that includes a user's digital photograph and advertisement images from selected advertisers. The new composed images are larger than the standard photographs in size (e.g., 4"×6", 5"×7") to allow the user's photograph to be in the standard size and to allow space for the advertisement images. The system provides a criteria specification tool to allow advertisers to accurately specify their target audiences based on, e.g., zip code, age, education. The system also provides a criteria specification tool to allow the user to specify his/her preferences of advertisement on his/her digital photograph production. The system further provides various layouts to prevent the user from clipping out advertisement images all at once. The system further allows advertisers to track their advertising results and allows the user to maintain his/her privacy. The system can be applied to contents other than advertisement image, such as announcements, personal messages, invitation cards and so on.

33 Claims, 22 Drawing Sheets

600

Target Audience Criteria

- Demographics
- Geographic
- Psychographics
- Purchase Behavior 25-34
College
$50,000 - $75,000
Not Disclosed Product Usage Upload Advertisement Image

*FIG. 6*

| | | |
|---|---|---|
| E-mail address: | _____ | (e.g., person@somewhere.com) |
| Full name: | _____ | (e.g., John M Doe) |
| Address: | _____ | (e.g., 1234 East Street) |
| City: | _____ | (e.g., Chicago) |
| State/Province (provinces below): | -- State -- ▾ | |
| Zip Code: | _____ | (e.g., 85672) |
| Country: | USA ▾ | |
| Primary phone #: | _____ | (e.g., (714) 555-1212) |
| How did you hear about us? | -- Select an option -- ▾ | |
| What do you use our site for? | -- Select an option -- ▾ | |
| Age: | 25-34 ▾ | |
| Education completed: | College ▾ | |
| Annual household income: | $50,000 - $75,000 ▾ | |
| Do you wish to participate in our online survey? | Yes I would ▾ | |
| Gender: | Not Disclosed ▾ | |

METHOD AND SYSTEM FOR DISTRIBUTING CONSUMER PHOTOGRAPH-BASED ADVERTISEMENT AND/OR INFORMATION

RELATED APPLICATION

This application claims the priority of U.S. Provisional Application No. 60/701,147, filed on Jul. 21, 2005, which is herein incorporated by reference.

FIELD OF THE INVENTION

The technical field relates to image composition and database retrieval, and, in particular, to a method and system for distributing consumer photograph-based advertisements and information.

BACKGROUND OF THE INVENTION

Most people consider photographs to be among their most valuable assets. A photograph provides a memorable image on physical media, which can be stored for a long time. A photograph also is an excellent mechanism for content distribution and storage. Current digital photo technology has been widely accepted and image composition technology has become mature.

Due to the memorable nature of the photographs, utilizing consumer photographs as a media to advertise products and/or services to the targeted consumer group certainly has advantages. One way to accomplish this is to add the advertisement to the consumer photographs. So far, however, no advertiser has ever considered such an approach.

SUMMARY OF THE INVENTION

What is disclosed is an exemplary system for distributing consumer photograph-based advertisements and information. The system includes a user information database capable of storing a user's information and a user's photograph and an advertisement database capable of storing advertisement images and target audience criteria. An advertiser can specify the target audience criteria. The advertisement database includes an algorithm capable of selecting advertisement images from the advertisement database based on the target audience criteria. The system further includes a layout template database capable of storing layout templates. Each layout template includes a user's photograph area and one or more advertisement image area. The system further includes a layout template generator capable of selecting a layout template from the layout template database and an image composition engine capable of combining the selected advertisement images with the user's photograph using the selected layout template to compose a new composed image. The new composed image includes the user's photograph and the selected advertisement images.

Also disclosed is an exemplary method for distributing consumer photograph-based advertisements and information. The method includes storing a user's information and user's photograph in a user information database and storing advertisement images and target audience criteria in an advertisement database. The target audience criteria can be specified by an advertiser. The method further includes selecting advertisement images from the advertisement database based on the target audience criteria and storing layout templates in a layout template database. Each layout template includes a user's photograph area and one or more advertisement image area. The method further includes selecting a layout template from the layout template database and combining the selected advertisement images with the user's photograph using the selected layout template to compose a new composed image. The new composed image includes the user's photograph and the selected advertisement images.

Further disclosed is an automatic image composition system that includes an advertisement image barcode system that generates a barcode on one or more selected advertisement images for an advertiser to track a result of advertising, a layout generator that randomly selects a layout template to be used to combine a user's photograph and the one or more selected advertisement images to compose a new image, and an image composition engine that combines the advertisement image with the user's photograph using the randomly selected layout template to compose a new composed image. The new composed image includes the user's photograph and the one or more selected advertisement image.

Still further disclosed is a computer readable medium provides instructions for distributing consumer photograph-based advertisements and information. The instructions include storing a user's information and user's photograph in a user information database and storing advertisement images and target audience criteria in an advertisement database. The target audience criteria can be specified by an advertiser. The instructions further include selecting advertisement images from the advertisement database based on the target audience criteria and storing layout templates in a layout template database. Each layout template includes a user's photograph area and one or more advertisement image area. The instructions further include selecting a layout template from the layout template database and combining the selected advertisement images with the user's photograph using the selected layout template to compose a new composed image. The new composed image includes the user's photograph and the selected advertisement images.

BRIEF DESCRIPTION OF THE DRAWINGS

The detailed description will refer to the following drawings in which like numerals refer to like elements, and in which:

FIG. 6 illustrates an exemplary target audience criteria configuration web page of the exemplary system of FIG. 4;

FIG. 7 illustrates an exemplary user configuration web page of an embodiment of the exemplary system of FIG. 2;

DETAILED DESCRIPTION OF THE INVENTION

What is disclosed is a method and system for distributing consumer photograph-based advertisements and information. The method and system retrieve digital images, such as a user's photograph and selected advertisement images, compose an image to include the user's photograph and the selected advertisement images, and distribute the new composed to the user. The method and system allow advertisers to specify parameters of advertising scope and to track advertisement results and allow a user to select information accompanying his/her photograph. The method and system allow the creation of a new image with various styles of templates and layouts. The method and system protect user's privacy at the time providing advertisers substantial marketing information.

The method and system take advantage of current content distribution media to offer user certain benefits in exchange of distributing user's photographs as well as additional information. The method and system utilize database retrieval systems that can accurately retrieve advertisement information for the target audiences and distributes this accurate advertisement information to the target audiences using widely accepted distribution channels, such as postal mail, supermarkets, photograph processing shops, and the like. The method and system track the results of an advertisement for advertisers so that the advertisers can analyze their return on investment, assess the statistics on advertisement distribution, and assess the information a user is willing to release.

Figure 1A:
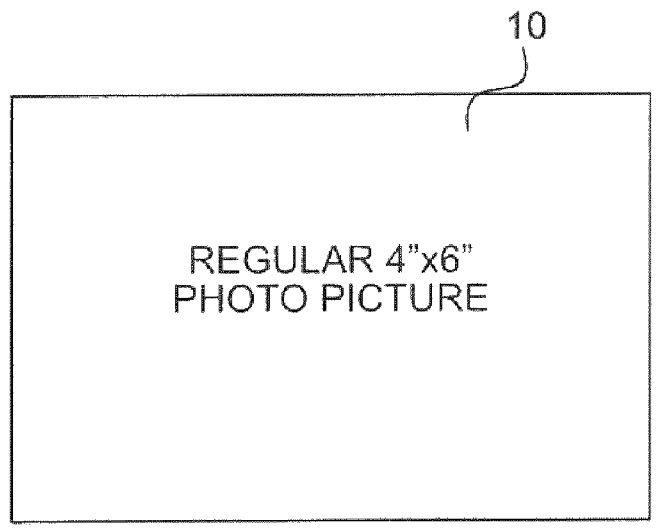
FIG. 1A illustrates an exemplary regular photograph.
Figure 1B:
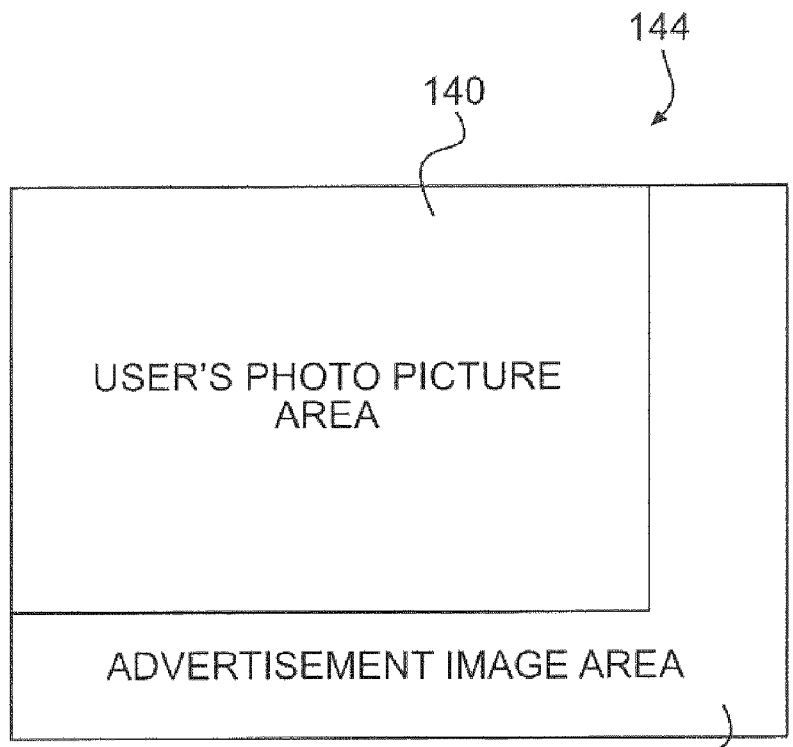
FIG. 1B illustrates an exemplary layout of a new composed image including a user's photograph area and an advertisement image area.

FIG. 1A illustrates an exemplary photograph 10, such as a 4"×6" photograph that most people process and store in their photo album. FIG. 1B illustrates an exemplary layout 144 of a new composed image including a user's photograph area 140 and an advertisement image area 142.

Figure 1C:
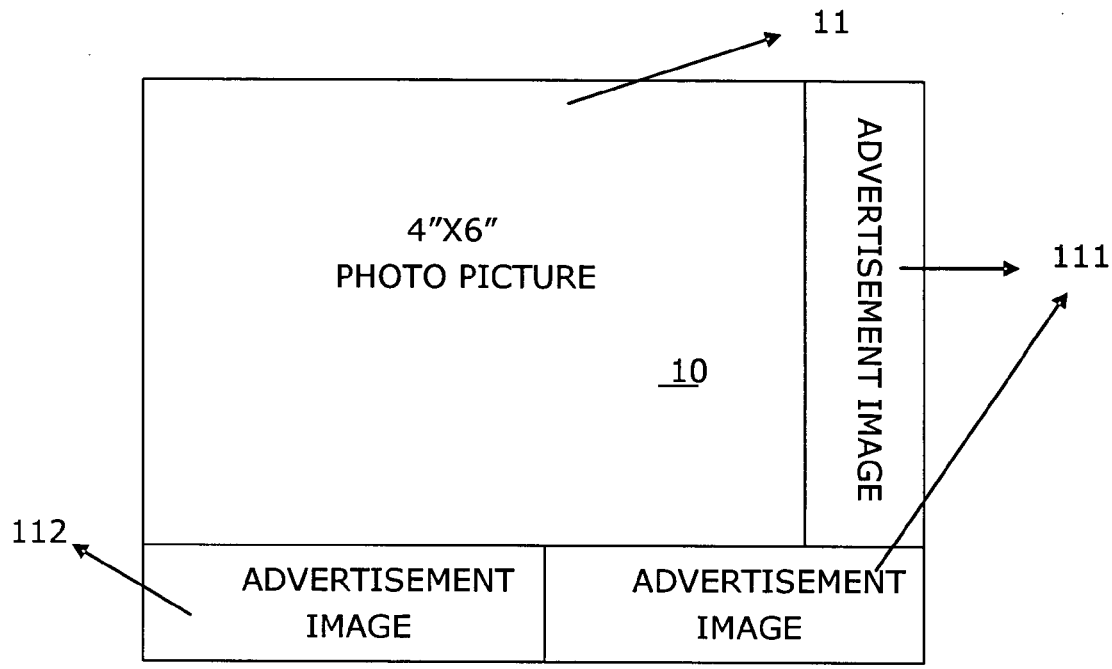
FIGS. 1C and 1D illustrate exemplary new composed images including photographs and advertisement images.
Figure 1D:
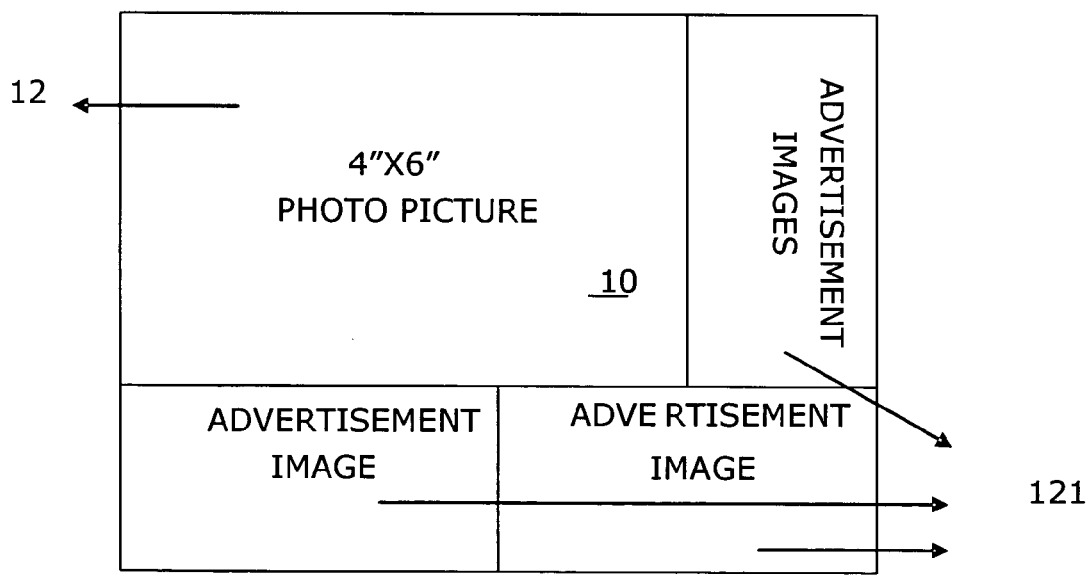

FIGS. 1C and 1D illustrate exemplary new composed images including photographs and advertisement images. Exemplary photograph 11 is a composed image including a user's original photograph 10 in the 4"×6" size and two 1"×4" advertisement images 111 and one 1"×3" advertisement image 112. The size of the composed image 11 is 5"×7", which is a standard size that most current imaging equipment can process. Referring to FIG. 1D, exemplary photograph 12 is a composed image including a user's original photograph 10 in the 4"×6" size and three 2"×4" advertisement images 121. The size of the composed image 12 is 6"×8", which is also a standard size that most current imaging equipment can process.

While the exemplary system and method are described using the size of 5"×7" and 6"×8" for the composed image, one skilled in the art will appreciate that the system and method can support different sizes of the composed image, such as 8"×10", 10"×13", 4"×6", and the like. Similarly, while the exemplary system and method are described using the size of 4"×6" for the user's photograph, one skilled in the art will appreciate that the system and method can support different sizes of the user's photograph, such as 5"×7", 3.5"×5", and the like. Likewise, the size of the advertisement images is not limited to the sizes described herein.

The composed images 11, 12 maintain the user's original photograph so that the user may easily clip the photograph 10 out of the composed images 11, 12 and obtain and store the photograph 10 in a regular photo album. While clipping the photograph 10 out of the composed images 11, 12, the user may have a good chance to view and consider the advertisement images 111, 121, which is desired by the advertisers. Alternatively, the user may store the entire composed image with advertisement images 111, 121, which is even more preferred by the advertisers. The composed images 11, 12 may serve as a new advertising and marketing media for advertisers.

Figure 2:
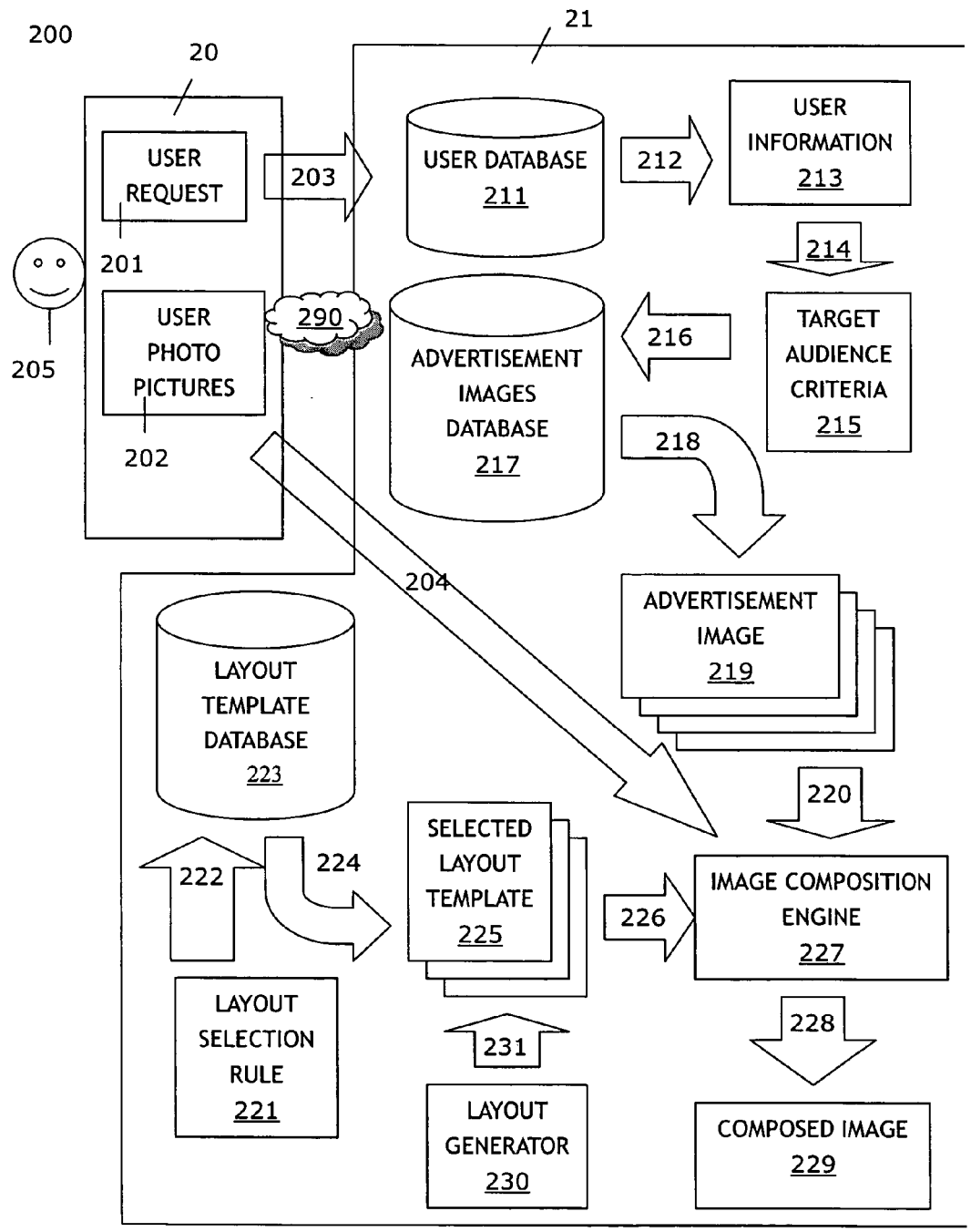
FIG. 2 illustrates an embodiment of an exemplary system for distributing consumer photograph-based advertisements and information.

FIG. 2 illustrates an embodiment of an exemplary system 200 for distributing consumer photograph-based advertisements and information. In this embodiment, a central platform 21, such as a server computer system, is coupled to a network 290 and the Internet. A client platform 20, such as a desktop computer, is also coupled to the network 290. The server computer system 21 includes a user information database 211, an advertisement images database 217, a layout template database 223, and an image composition engine 227. The server computer system 21 is adapted to retrieve digital images from the advertisement images database 217 and to retrieve the user's photograph 202 from the desktop computer 20. The server computer system 21 composes and generates new digital images. The new composed image is then sent to a printing or processing mechanism for production. The server computer system 21 also provides web-based statistic and configuration tools for both advertisers and users to specify parameters.

A user 205 uses the client platform 20 to send a user request 201 and upload the user's photographs 202 to the central server platform 21 by logging on and using web-based interfaces 203, 204. User information 213 may be retrieved from the log-on information and the user information database 211 (shown as arrow 212). A database query may be formed incorporating the user information 213 and an advertiser's target audience criteria 215 (shown as arrow 214). An advertiser can specify the target audience criteria 215 using, for example, a web-based target audience criteria tool. This tool allows an advertiser to specify criteria in an exemplary system 400 (shown in FIG. 4) by either interfacing with a data input interactive web page 600 (shown in FIG. 6) using an Internet web browser or using a software application that provides a data entry user interface similar to FIG. 6. This tool sends one or more advertisement images accompanied with data provided by an advertiser back to the advertisement images database 217 (shown as arrow 216). The advertisement images database 217 includes an algorithm capable of selecting advertisement images 219 based on the target audience criteria 215, which is stored with the advertisement image 219 in the advertisement images database 217, and the user information 213. Selected advertisement images 219 are retrieved from the advertisement images database 217 (shown as arrow 218).

The system 200 may use two methods to derive a layout template 225. using a layout template generator 230. A layout template selection rule 221 may be translated (shown as arrow 222) into a database query to access the layout template database 223 and to select layout templates 225. Layout templates 225 may be selected and retrieved (shown as arrow 224) from the layout template database 223 based on the layout template selection rule 221. The layout templates 225 stored in the layout template database 223 may be associated with information like background color, design style, number of advertisement images 219, occasions and more design related attributes. The layout template selection rule 221 generates a database query according to age, gender and design (visual) preferences of the user 205 and sends the database query to the layout template database 223 to select layout templates 225 that are most appropriate to the user 205 (target audience) to achieve the best result of advertisement. Alternatively, the layout template generator 230 may randomly generate the layout template 225 (shown as arrow 231). (Random template generation will be described in detail below with respect to FIGS. 8-12).

When user's photographs 202, matched advertisement images 219, and selected layout templates 225 are ready, the image composition engine 227 may select one layout template 225 (shown as arrow 226) and appropriate number of advertisement images 219 (shown as arrow 220) to compose a new image 229 (shown as arrow 228) for each user's photograph 202. After the user's photographs 202 are processed by the image composition engine 227, the new composed images 229 may be sent to printing or digital photo processing equipment for production.

Figure 3:
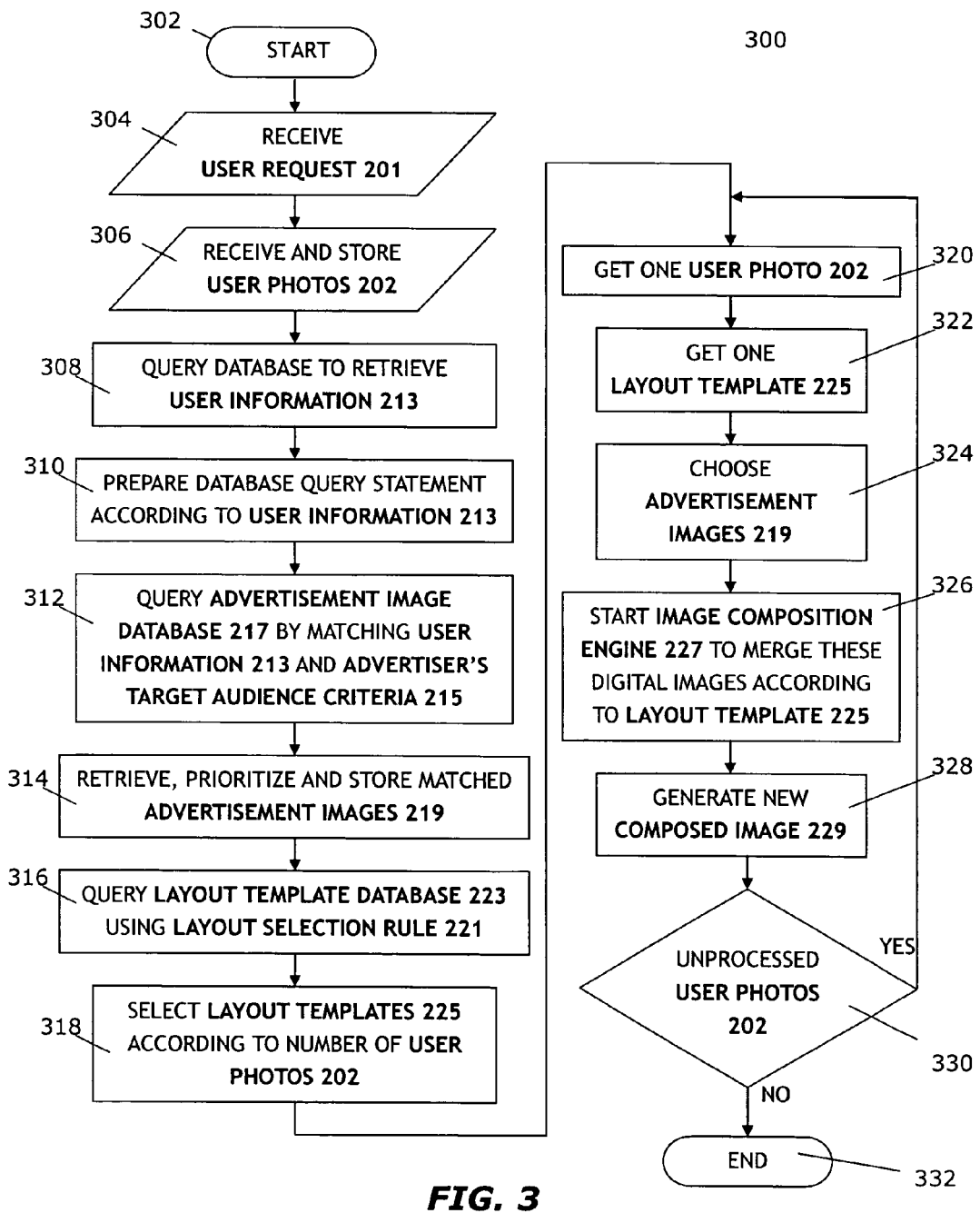
FIG. 3 is a flowchart illustrating an exemplary method for distributing consumer photograph-based advertisements and information using the exemplary system of FIG. 2.

FIG. 3 is a flowchart illustrating an exemplary method 300 for distributing consumer photograph-based advertisements and information using the exemplary system 200 of FIG. 2.

The method 300 starts (block 302) by receiving the user request 201 (block 304) and receiving and storing the user's photographs 202 (block 306) through web-based interfaces 203, 204. The method 300 queries the user database 211 to retrieve the user information 213 (block 308). The method 300 prepares a database query according to the user information (block 310) and queries the advertisement images database 217 by matching the user information 213 and an advertiser's target audience criteria 215 (block 312). The method 300 retrieves, prioritizes, and stores the matched advertisement images 219 (block 314).

The method 300 queries the layout template database 223 using, for example, the layout selection rule 221 (block 316), and selects the layout templates 225 according the number of the user's photographs 202 (block 318).

For each user's photograph 202 (block 320), the method 300 obtains a layout template 225 (block 322) and chooses appropriate advertisement images 219 (block 324). Next, the image composition engine 227 starts to merge the user's photograph 202 and the selected advertisement images 219 according to the layout template 225 (block 326) and generates a new composed image 229 (block 328). If there are more unprocessed user's photographs 202 (block 330), the method 300 goes back to block 320. Otherwise, the method 300 ends in block 332.

Figure 4:
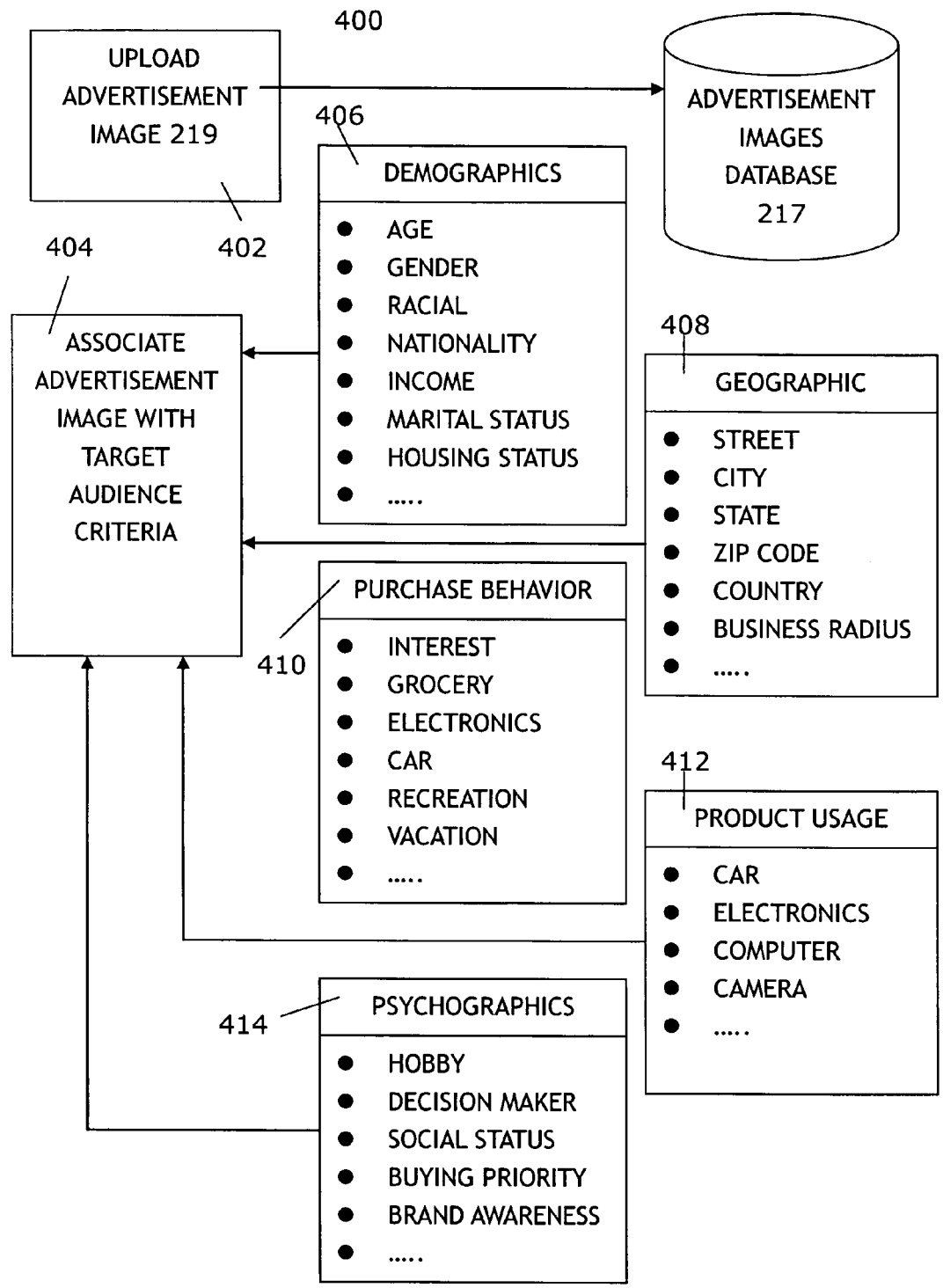
FIG. 4 illustrates another embodiment of an exemplary system providing advertiser management and configuration.

FIG. 4 illustrates another embodiment of an exemplary system 400 for providing advertiser management and configuration. An advertiser may upload one or more advertisement images 219 (block 402) to the advertisement image database 217 (also shown in FIG. 2) and may associate each advertisement image 219 with the target audience criteria 215 (block 404). The advertisement image 219 needs to comply to the size (e.g., dimension) that is allowed to be composed with the user's photograph 202 to generate the composed image 229.

The target audience criteria 215 may include information on demographics 406, geographic 408, purchase behavior 410, product usage 412, psychographics 414, and the date range of the advertisement. Demographic information 406 may include, for example, age, gender, race, nationality, income, marital status, housing status, and the like. Geographic information 408 may include, for example, street, city, state, zip code, country, business radius, and the like. Purchase behavior information 410 may include, for example, interest, grocery, electronics, car, recreation, vacation, and the like. Product usage information 412 may include, for example, car, electronics, computer, camera, and the like. Psychographics information 414 may include, for example, hobbies, decision maker, social status, buying priority, brand awareness, and the like. The information 406, 408, 410, 412, 414 may be used to determine if the associated advertisement image 219 can be selected to incorporate into the user's photograph 202 according to advertiser's target audience criteria 215.

Figure 5:
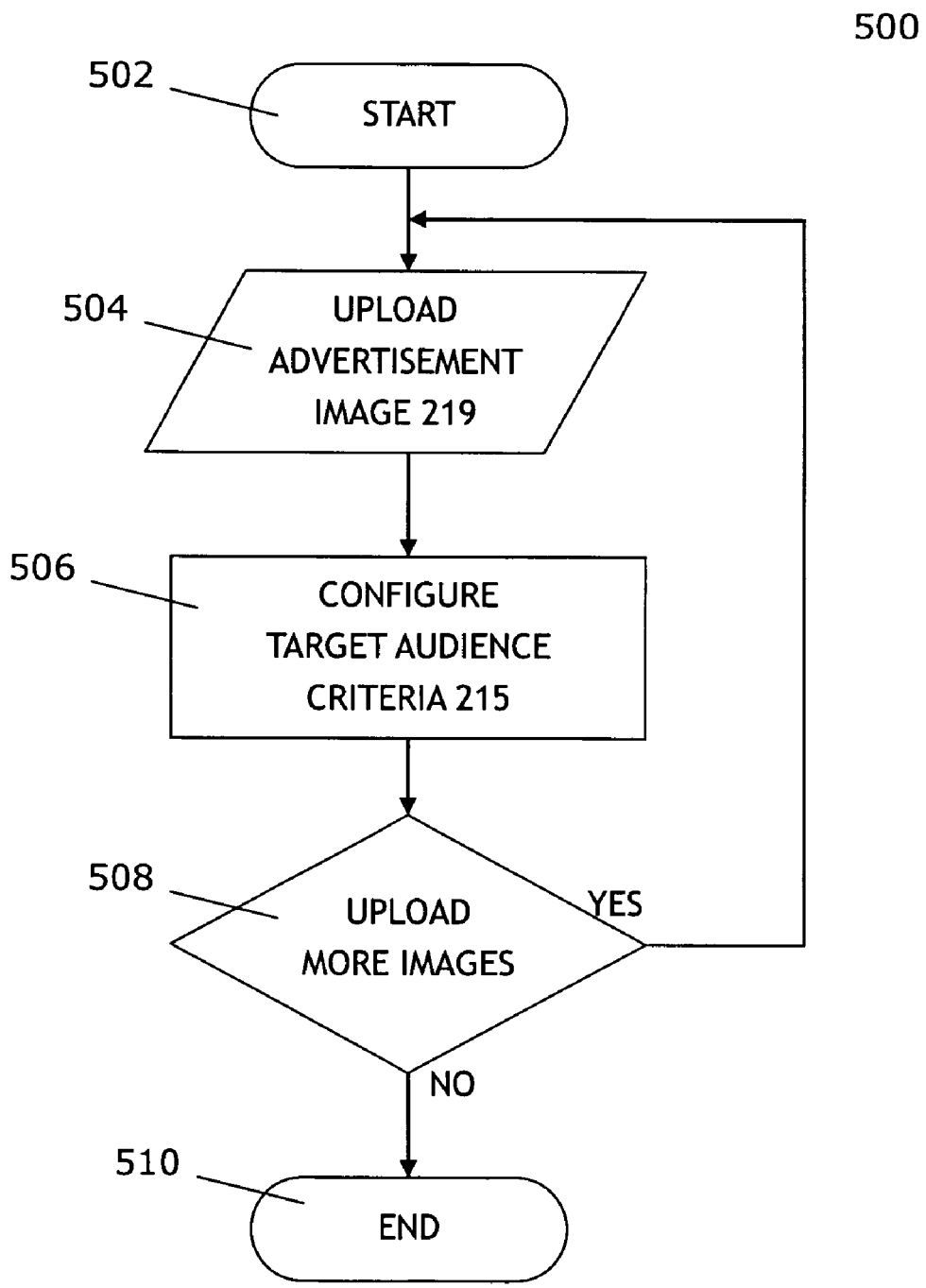
FIG. 5 is a flowchart illustrating an exemplary method for providing advertiser management and configuration using the exemplary system of FIG. 4.

FIG. 5 is a flowchart illustrating an exemplary method 500 for providing advertiser management and configuration using the exemplary system 400 of FIG. 4. The method 500 starts in block 502 and proceeds to uploading the advertisement images 219 (block 504). The method configures the target audience criteria 215 (block 506). If there are more advertisement images 219 to be uploaded (block 508), the method 500 goes to block 504. Otherwise, the method 500 ends in block 510.

FIG. 6 illustrates an exemplary target audience criteria configuration web page 600 of the system 400 of FIG. 4. FIG. 7 illustrates an exemplary user configuration web page 700 of an embodiment of the exemplary system 200 of FIG. 2. User specified information is preferably as simple as possible so that a user will not become impatient in filling out all the necessary fields. The more tolerant the user is, the more likely the user will view the advertisements associated with the photograph.

Figure 8A:
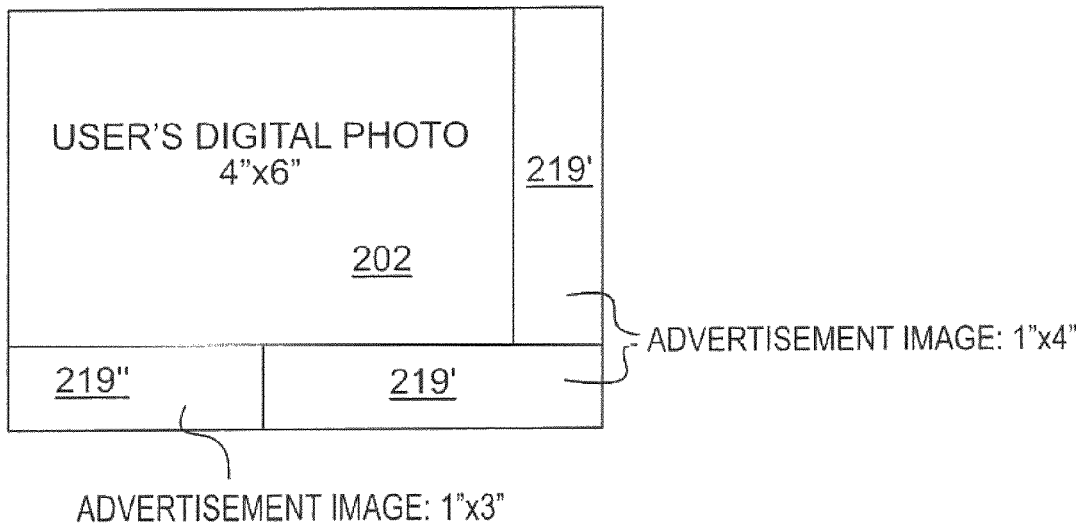
FIGS. 8A-8C illustrate exemplary layouts of a new composed image that has a final image size of 5"×7"
Figure 8B:
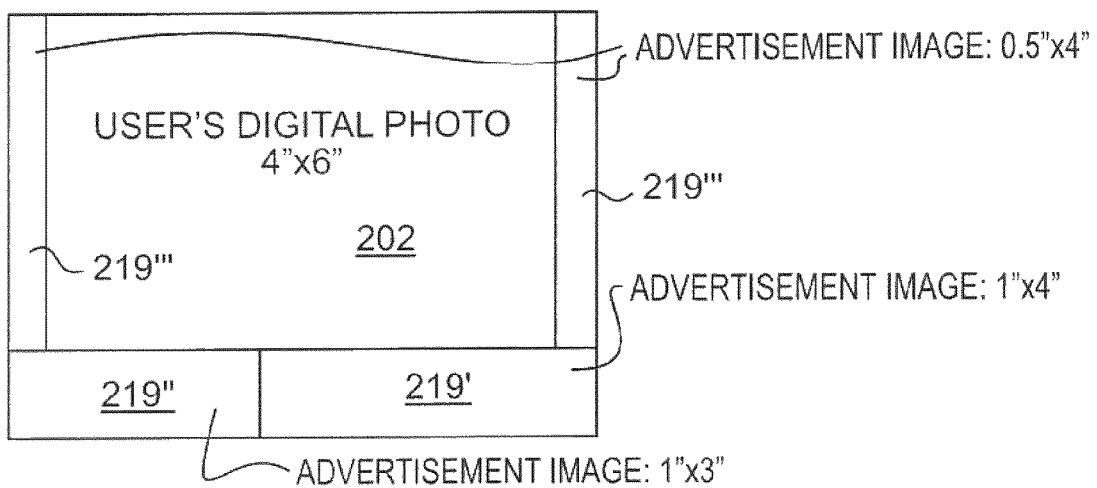
Figure 8C:
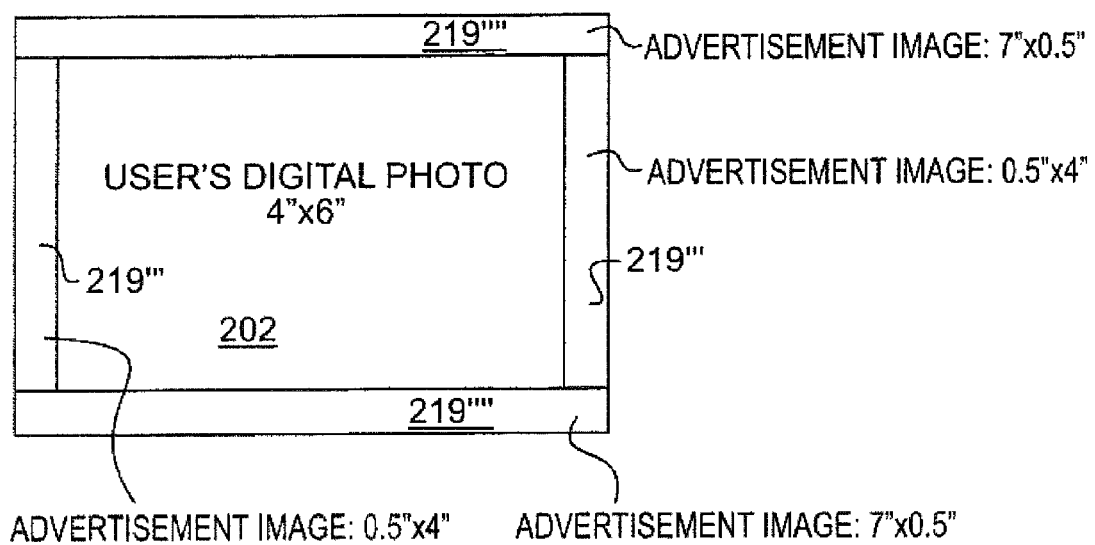

FIGS. 8A-8C illustrate exemplary layouts 144 of a new composed image 229 that has a final image size of 5"×7". The placement of the user's photograph 202 and the advertisement images 219 (shown as 219'-219"") is different for each of the composed images 229 in FIGS. 8A-8C, so that the user cannot easily clip out the advertisement images 219 all at once and skip viewing the advertisement images 219. This is desired by advertisers. However, the new composed images 229 still maintains the advertisement images 219 with certain size standard in order to simplify the advertiser's work in designing the advertisement images 219.

Figure 9A:
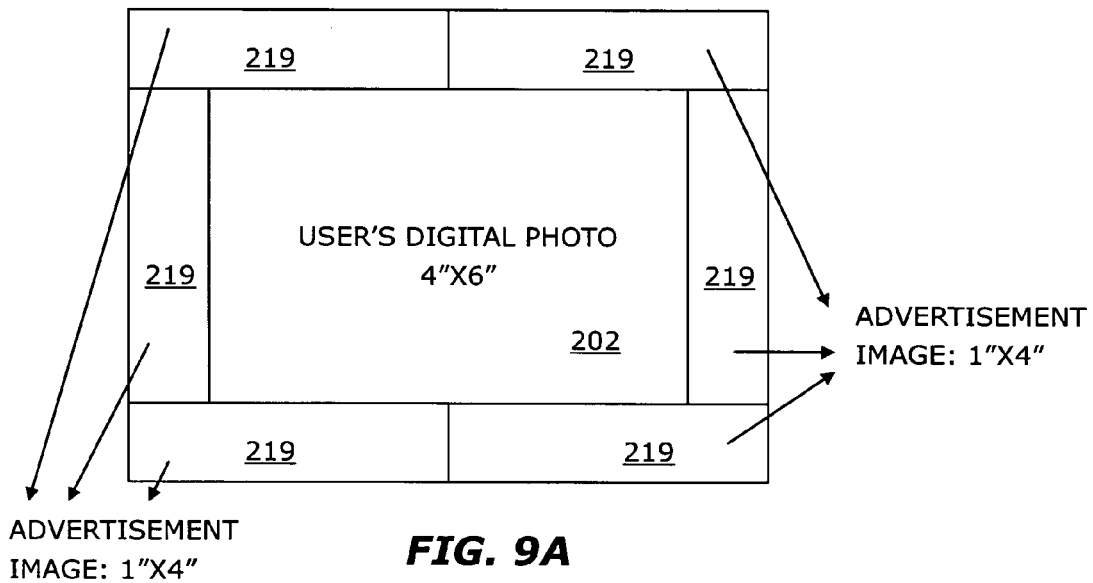
FIGS. 9A-9B illustrate exemplary layouts of a new composed image that has a final image size of 6"×8"
Figure 9B:
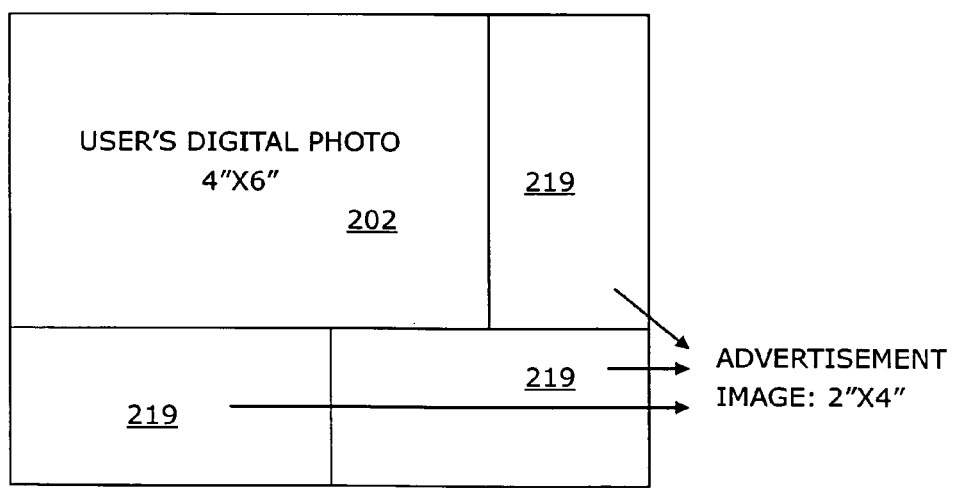

FIGS. 9A-9B illustrate exemplary layouts 144 of a new composed image that has a final image size of 6"×8". Similarly, the placement of the user's photograph 202 and the advertisement images 219 is different for each of the composed images 229 in FIGS. 9A-9B.

Figure 10A:
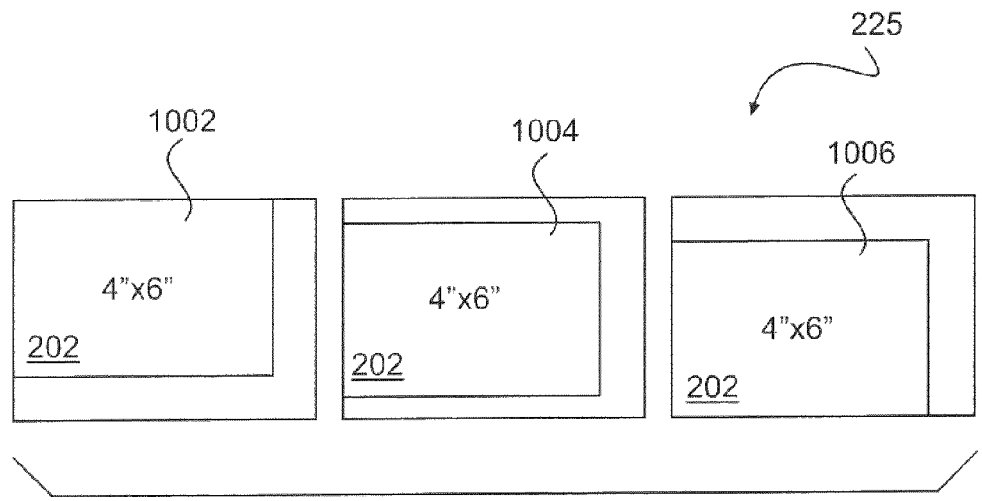
FIGS. 10A and 10B illustrate an exemplary mathematical calculation for generating a layout template for a 5"×7" final composed image with a 4"×6" user's photograph.
Figure 10B:
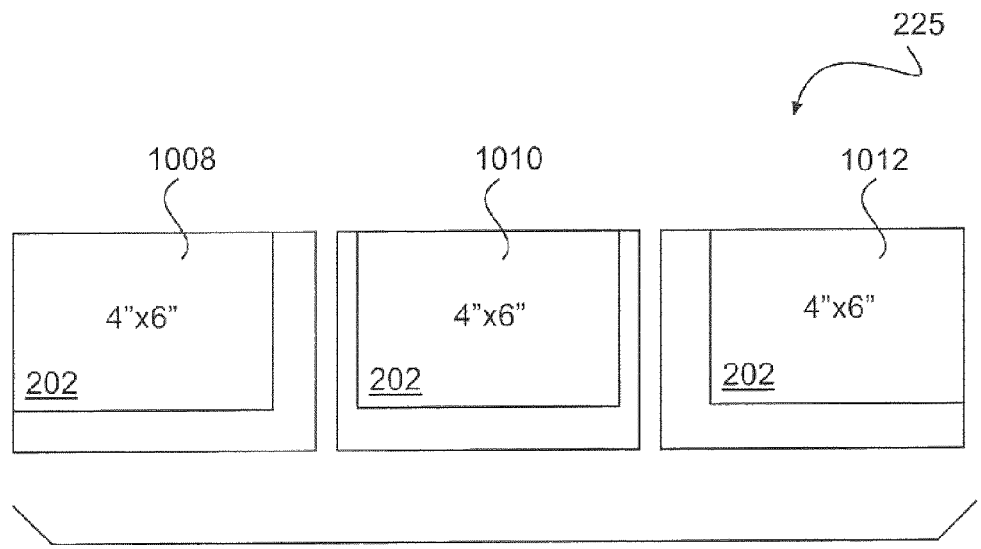

FIGS. 10A and 10B illustrate an exemplary mathematical calculation for generating a layout template 225 for a 5"×7" final composed image 229 with a 4"×6" user's photograph 202. For a final composed image 229 of size 5"×7", there are three choices of vertical positions: 1002, 1004 or 1006, as shown in FIG. 10A. There are three choices of horizontal positions: 1008, 1010 or 1012, as shown in FIG. 10B. If the width of an advertisement image 219 is 0.5 inch or 1 inch, there are nine combinations of choices to determine a layout template 225, which is sufficient to prevent user from clipping out all advertisement images 219 all at once.

Figure 11A:
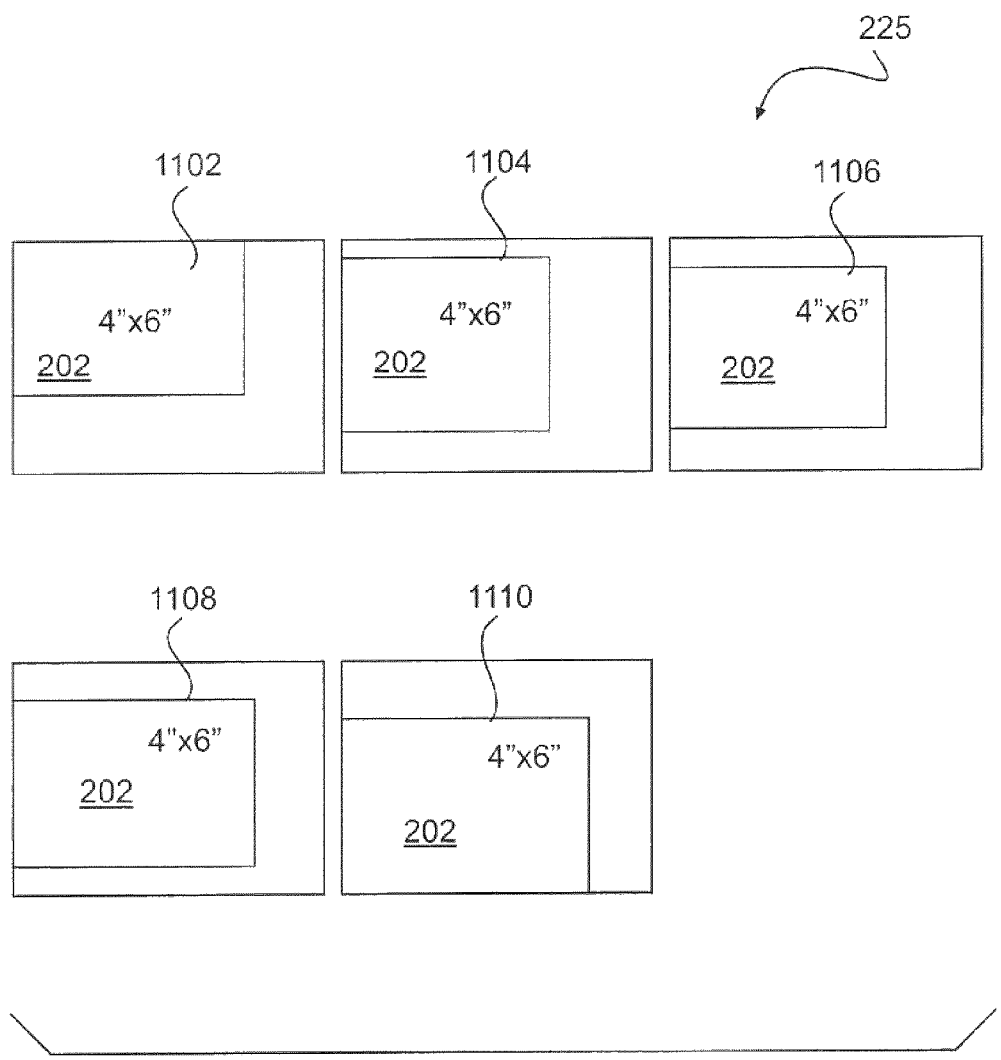
FIGS. 11A and 11B illustrate an exemplary mathematical calculation for generating a layout template for a 6"×8" final composed image with a 4"×6" user's photograph.
Figure 11B:
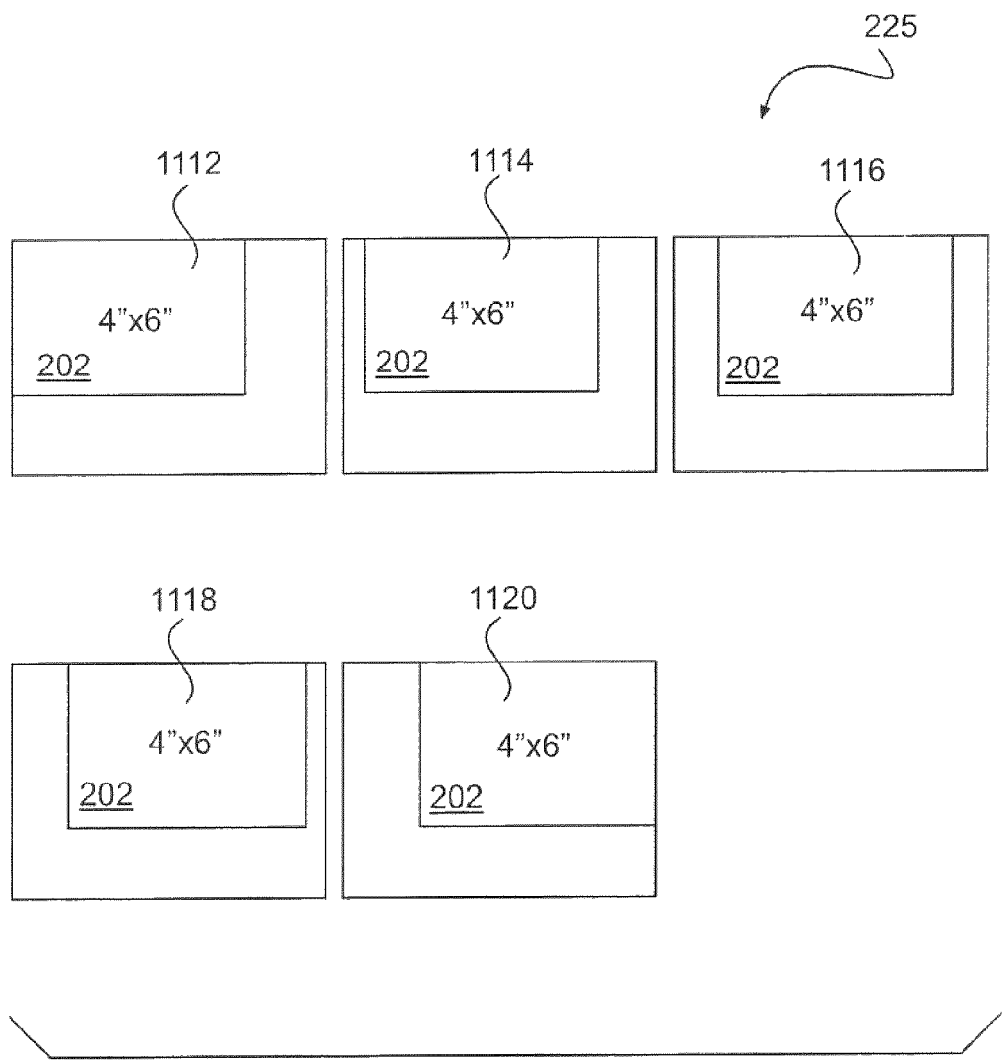

FIGS. 11A and 11B illustrate an exemplary mathematical calculation for generating a layout template 225 for a 6"×8" final composed image 229 with a 4"×6" user's photograph 202. For a final composed image 229 of size 6"×8", there are five choices of vertical positions: 1102, 1104, 1106, 1108 and 1110, as shown in FIG. 11A. There are also five choices of horizontal positions: 1112, 1114, 1116, 1118 or 1120, as shown in FIG. 11B. If the width of an advertisement image 219 (not shown) is 0.5 inch, 1 inch, 1.5 inches, or 2 inches, there are twenty-five combinations of choices to determine a layout template 225, which is again sufficient to prevent user from clipping out all advertisement images 219 all at once.

Figure 12:
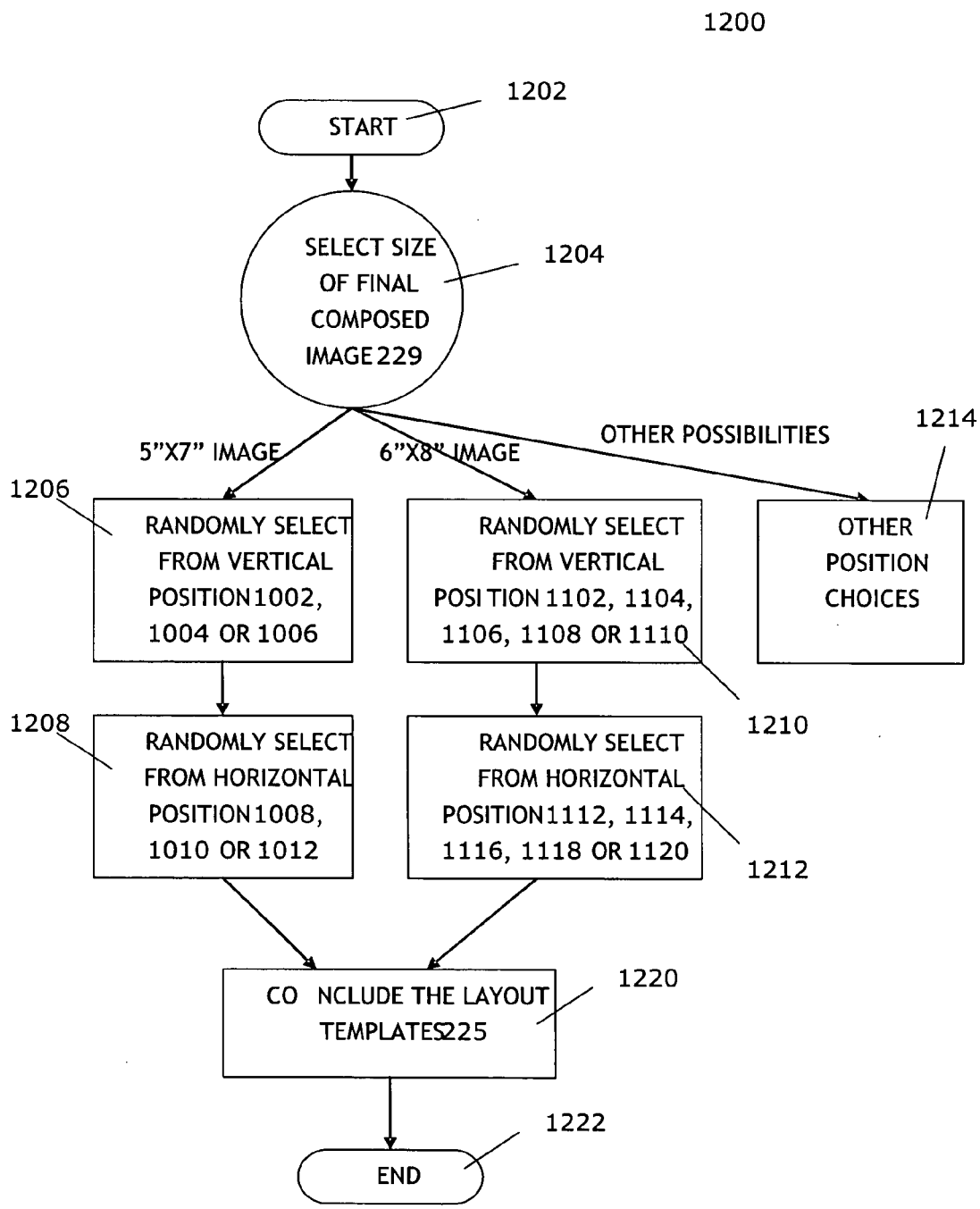
FIG. 12 is a flowchart illustrating an exemplary method for generating a layout template.

FIG. 12 is a flowchart illustrating an exemplary method 1200 for generating a layout template 225. The method 1200 starts at block 1202 and selects the size of the final composed image 229 (block 1204). For a 5"×7" composed image 229, the method 1200 randomly selects from vertical positions 1002, 1004, 1006 (block 1206) and randomly selects from horizontal positions 1008, 1010, 1012 (block 1208). For a 6"×8" composed image 229, the method 1200 randomly selects from vertical positions 1104, 1106, 1108, 1110 (block 1210) and randomly selects from horizontal positions 1112, 1114, 1116, 1118, 1120 (block 1212). For other sizes of the composed images 229, the method selects other position choices (block 1214). The method concludes the layout template 225 (block 1220) and ends in block 1222.

Figure 13:
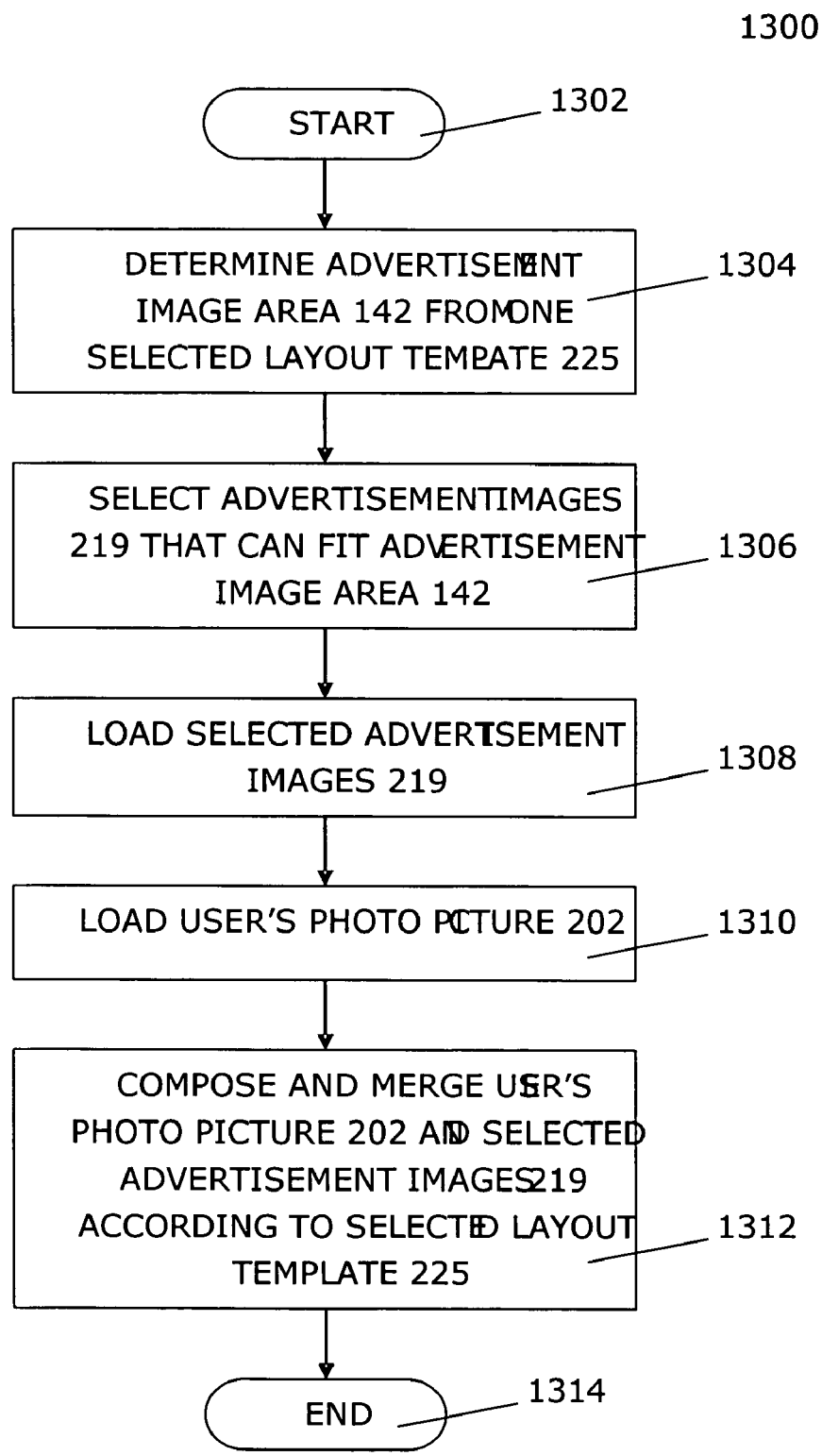
FIG. 13 is a flowchart illustrating an exemplary method for composing images using the image composition engine.

FIG. 13 is a flowchart illustrating an exemplary method 1300 for composing images using the image composition engine 227. The method 1300 starts in block 1302, and determines the advertisement image area 142 from the selected layout template 225 (block 1304). The method 1300 uses the image composition engine 227 to locate and select advertisement images 219 that fit the advertisement image area 142 (block 1306). The method 1300 uses the image composition engine 227 to load the selected advertisement images 219 (block 1308) and the user's photograph 202 (block 1310). The method 1300 then composes and merges the user's photograph 202 and the selected advertisement images 219 according to the selected layout template 225 (block 1312). The method 1300 ends in block 1314.

Figure 14:
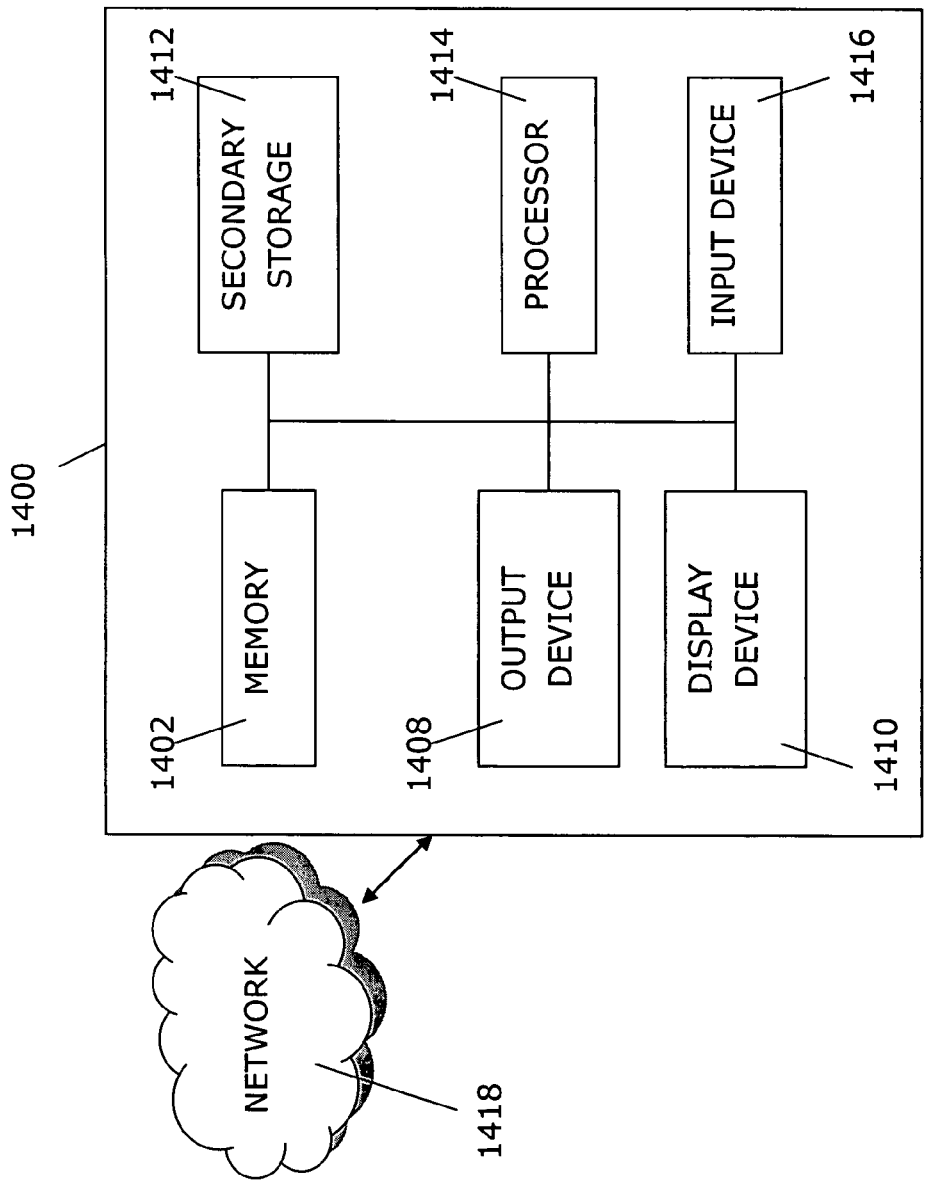
FIG. 14 illustrates exemplary hardware components of a computer that may be used in connection with the method for distributing consumer photograph-based advertisements and information.

FIG. 14 illustrates exemplary hardware components of a computer 1400 that may be used in connection with the method for distributing consumer photograph-based advertisements and information. The computer 1400 includes a connection with a network 1418 such as the Internet or other type of computer or telephone network. The computer 1400 typically includes a memory 1402, a secondary storage device 1412, a processor 1414, an input device 1416, a display device 1410, and an output device 1408.

The memory 1402 may include random access memory (RAM) or similar types of memory. The secondary storage device 1412 may include a hard disk drive, floppy disk drive, CD-ROM drive, or other types of non-volatile data storage, and may correspond with various databases or other resources. The processor 1414 may execute information stored in the memory 1402, the secondary storage 1412, or received from the Internet or other network 1418, such as the digital image information. The input device 1416 may include any device for entering data into the computer 1400, such as a keyboard, keypad, cursor-control device, touch-screen (possibly with a stylus), or microphone. The display device 1410 may include any type of device for presenting visual image, such as, for example, a computer monitor, flat-screen display, or display panel. The output device 1408 may include any type of device for presenting data in hard copy format, such as a printer, and other types of output devices including speakers or any device for providing data in audio form. The computer 1400 can possibly include multiple input devices, output devices, and display devices.

Although the computer 1400 is shown with various components, one skilled in the art will appreciate that the computer 1400 can contain additional or different components. In addition, although aspects of an implementation consistent with the method for distributing consumer photograph-based advertisements and information are described as being stored in memory, one skilled in the art will appreciate that these aspects can also be stored on or read from other types of computer program products or computer-readable media, such as secondary storage devices, including hard disks, floppy disks, or CD-ROM; or other forms of RAM or ROM. The computer-readable media may include instructions for controlling the computer 1400 to perform a particular method.

Figure 15:
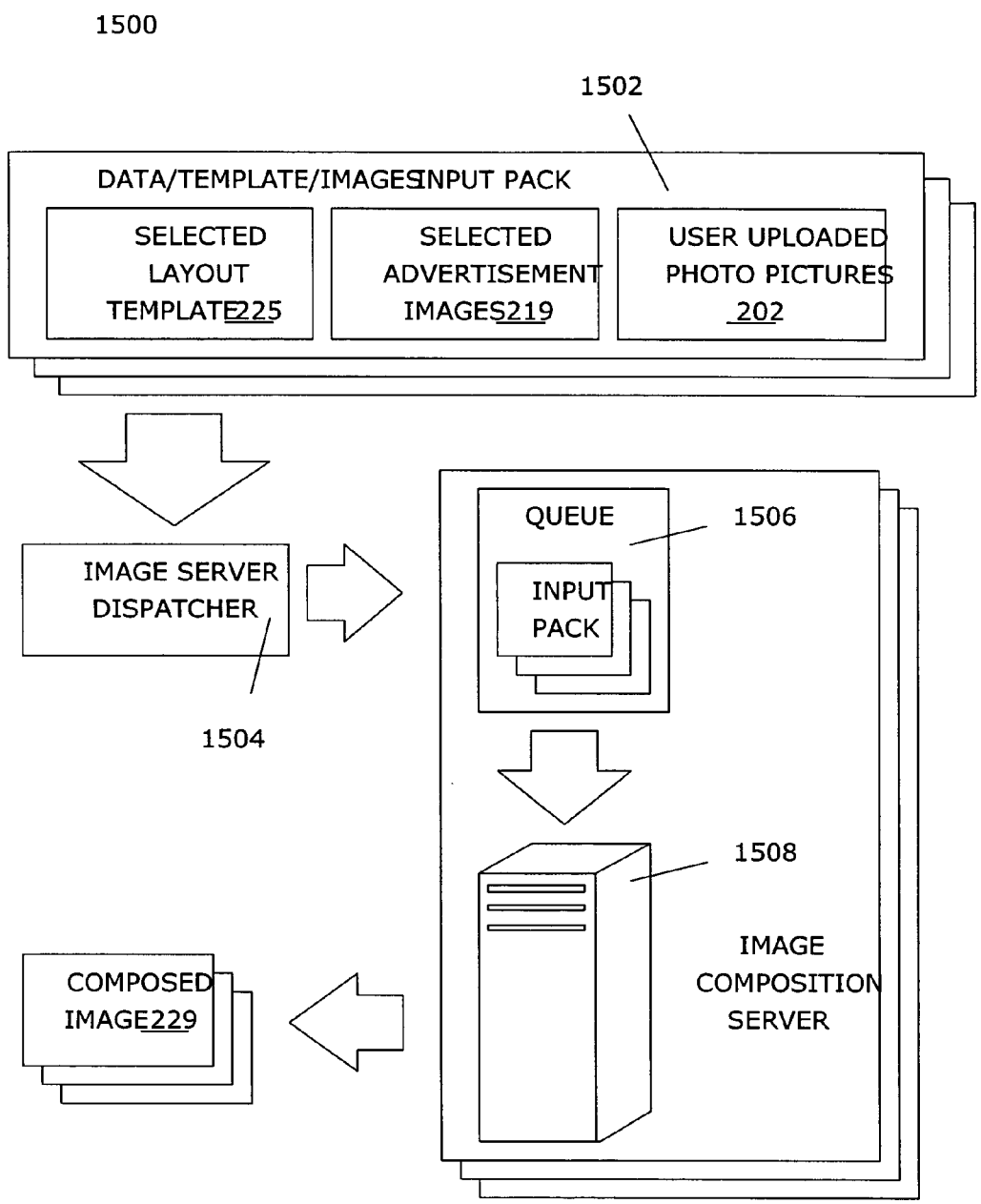
FIG. 15 illustrates an exemplary server load balancing mechanism that distributes loads of servers that process the images.

FIG. 15 illustrates an exemplary server load balancing mechanism 1500 that distributes loads of servers that process the images. The server load balancing mechanism 1500 includes one or more data input pack 1502. Each data input pack 1502 includes selected layout templates 225, selected advertisement images 219 and user's uploaded photographs. The data input packs 1502 are sent to an image server dispatcher 1504 when ready. The image server dispatcher 1504 assigns each data input pack 1502 to an image composition server queue 1506 based on the number of composition tasks each image composition server 1508 is processing. After the image composition server 1508 finishes each processing, each composed image 229 is stored in a common storage.

Figure 16:
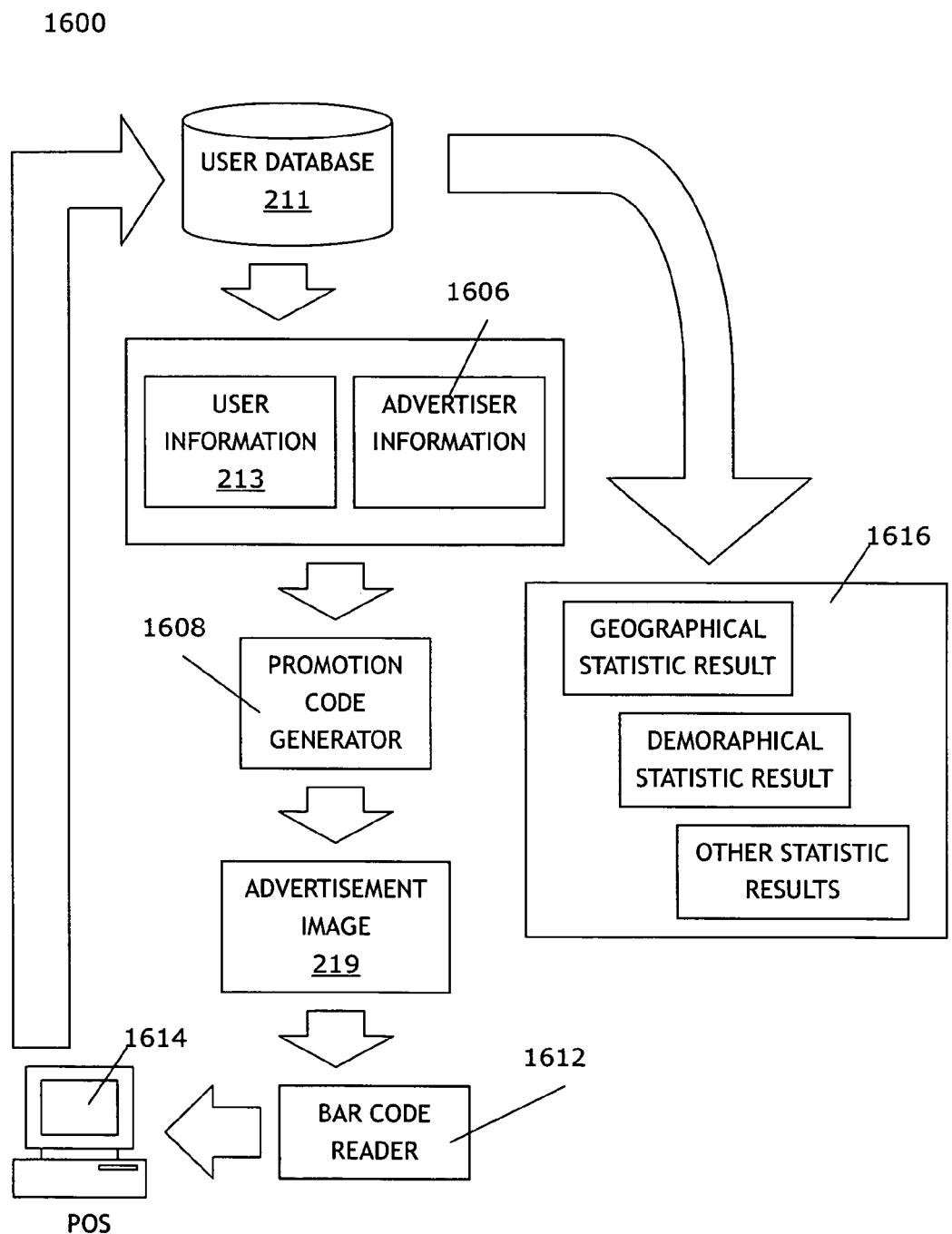
FIG. 16 illustrates an exemplary web-based result tracking tool that may be used in connection with the method for distributing consumer photograph-based advertisements and information.

Further, the method for distributing consumer photograph-based advertisements and information allows advertisers to track their advertising result using a web-based result tracking tool. FIG. 16 illustrates an exemplary web-based result tracking tool 1600 that uses a promotion code generator 1608 to generate a unique or non-unique alpha-numeric promotion code or tracking code (not shown) on each advertisement image 219 according to the advertiser's request. The promotion code generator 1608 obtains user information 213 and advertiser information 1606 from the user database 211. This tool 1600 may generate a barcode for this promotion code or tracking code to be placed on each advertisement image 219 according to the advertiser's request. Alternatively, this tool 1600 can place the advertiser's promotion code directly on each advertisement image 219. When a user accesses this promotion code, this information can be collected from a retailer's point of sale (POS) machine 1614 or a dedicated barcode reader 1612. By generating a unique tracking code for each advertisement image 219, this tool 1600 tracks which promotion code is used, thus providing accurate statistics, such as effective geographical distribution, effective demographical distribution or others 1616.

Figure 17:
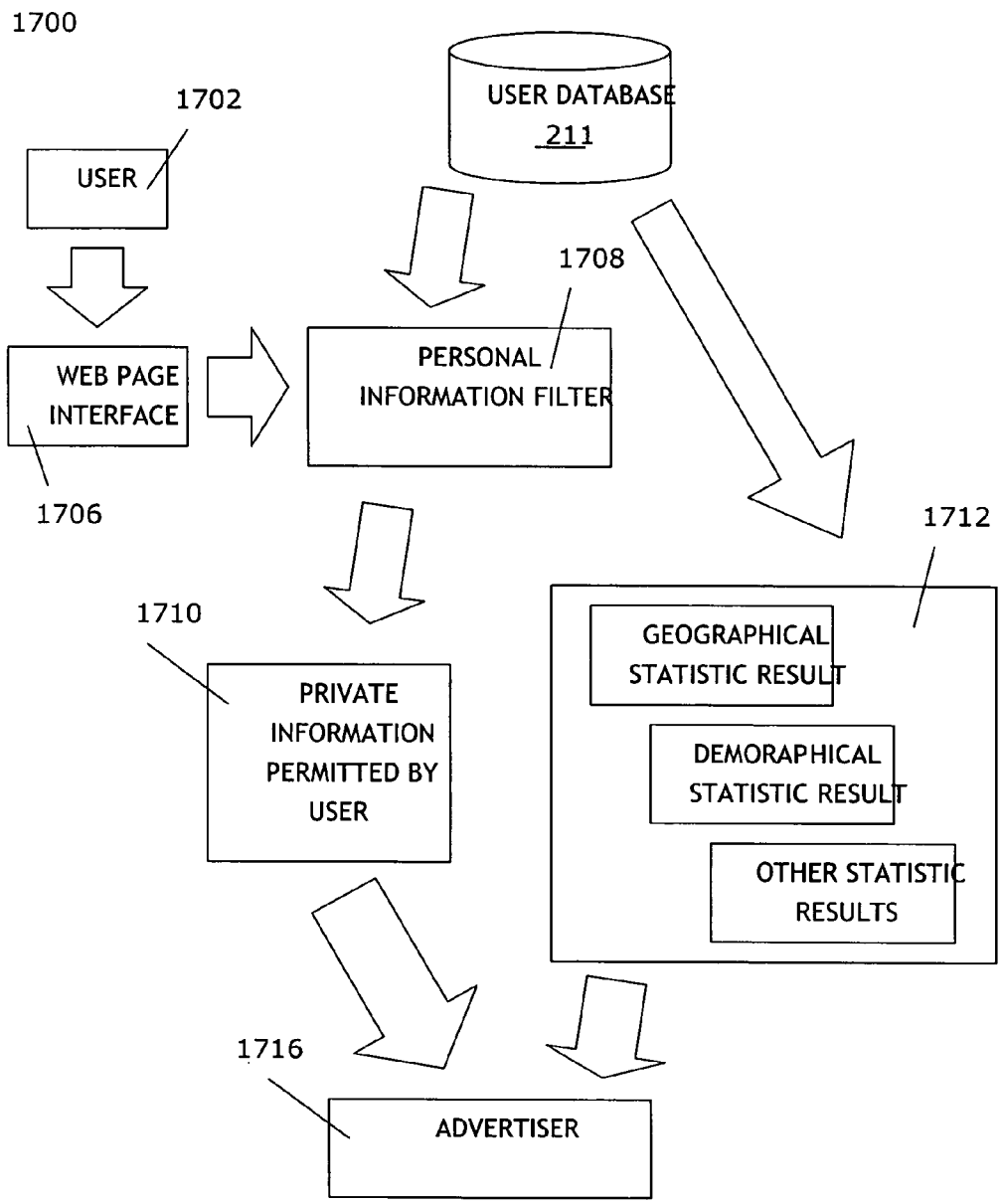
FIG. 17 illustrates an exemplary privacy maintenance system that may be used in connection with the method for distributing consumer photograph-based advertisements and information.

The method also allows a user to maintain his/her privacy. FIG. 17 illustrates an exemplary privacy maintenance system 1700. A user 1702 may use a web page interface 1706 to specify personal information that the user 1702 is willing to release to advertisers, such as an email address, a phone number or a home address in exchange of better services, promotions or the like from the advertisers. The web page interface 1706 may be used to modify an information filter 1708 to specify his/her private information that the user is willing to release to an advertiser 1716. The advertiser 1716 may be able to retrieve various anonymous statistics results 1712 provided by the user database 211 as well as the private information 1710 permitted by the user 1702.

Figure 18A:
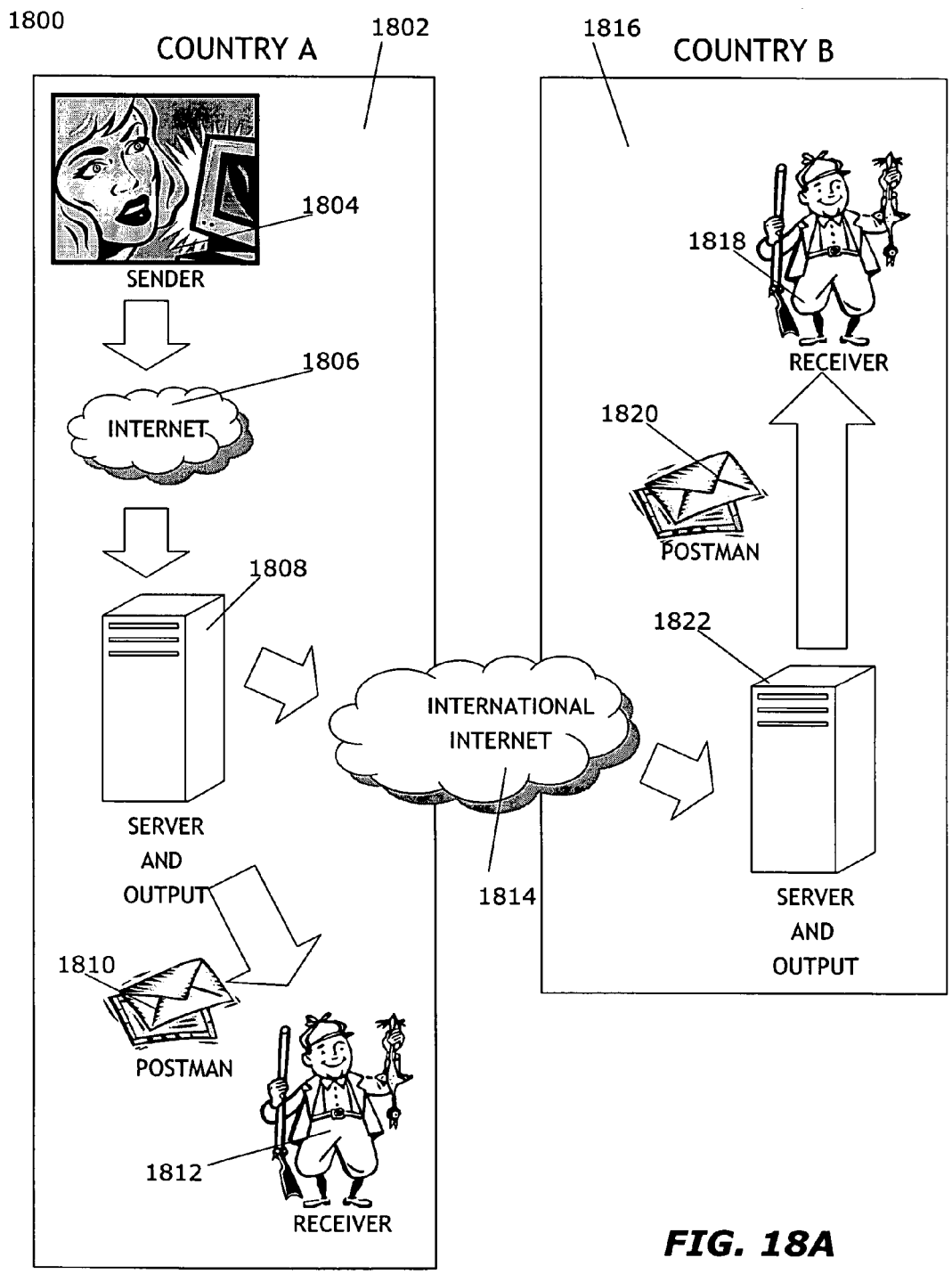
FIGS. 18A and 18B illustrate an exemplary process for international exchange of photographs.
Figure 18B:
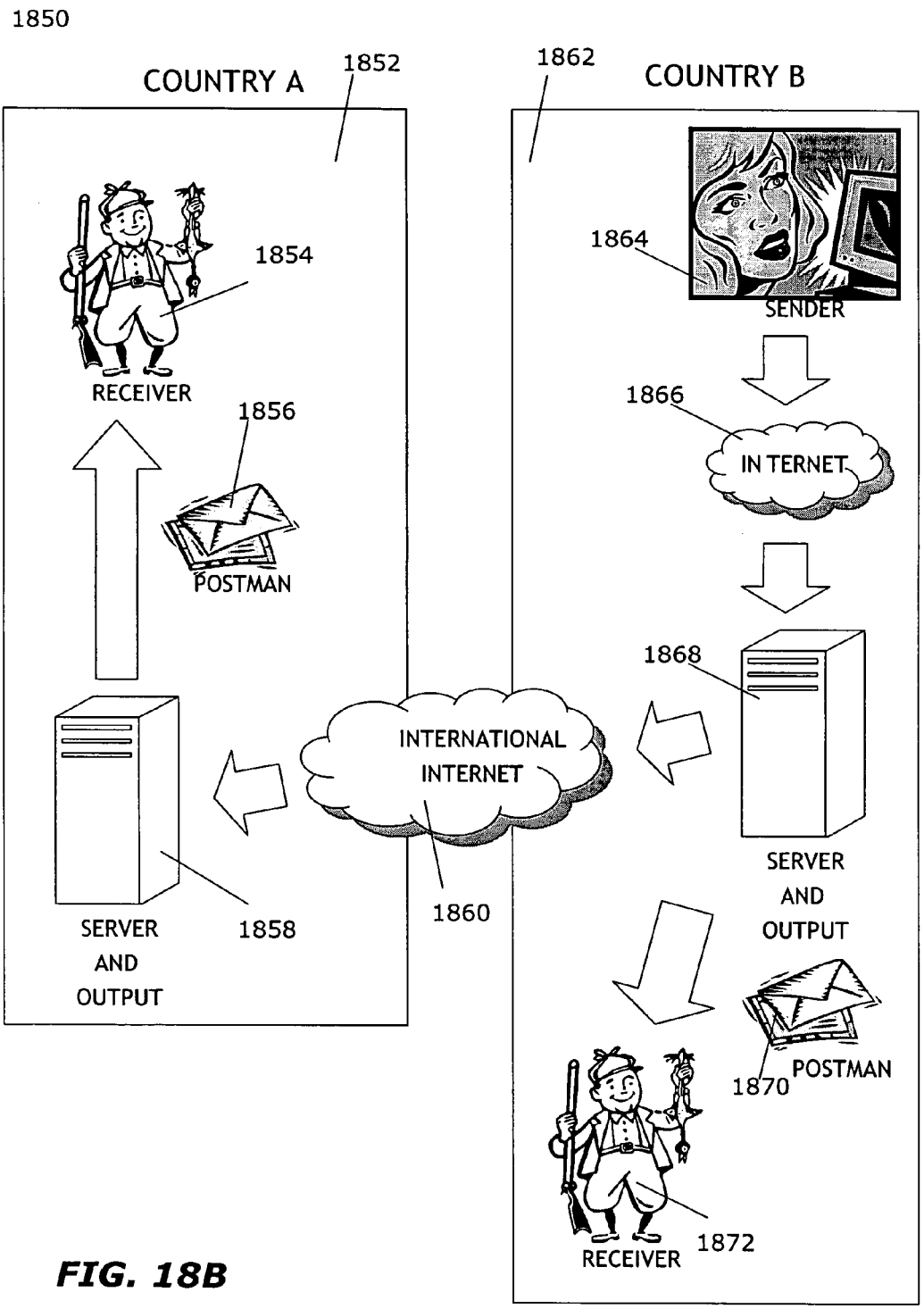

The method also allows a user and advertiser to take advantage of the local rate of postage. FIGS. 18A and 18B illustrate an exemplary process 1800 and 1850, respectively, for international exchange of photographs. Referring to FIG. 18A, a sender 1804 in country A 1802 that uploads his/her picture to a server 1808 in country A through the Internet 1806. Then the picture output can be delivered by a postman 1810 of country A to a domestic receiver 1812. The picture can also be transmitted through the international Internet 1814 to a server 1822 in country B 1816. The picture output can be delivered by a postman 1820 of country B to a receiver 1818 in country B.

Similarly, in FIG. 18B, a sender 1864 in country B 1862 uploads a picture to a server 1868 through the local Internet 1866. The output can be delivered to a local receiver 1872 by a postman 1870. The picture can be transmitted through the international Internet 1860 to a server 1858 in country A 1852. The output can be delivered to a receiver 1854 by a postman 1856 in country A 1852.

While the system and method for distributing consumer photograph-based advertisements and information have been described in connection with an exemplary embodiment, those skilled in the art will understand that many modifications in light of these teachings are possible, and this application is intended to cover variations thereof. For example, the system and method can be applied to contents other than advertisement image, such as announcement, personal messages, invitation card, greeting card and the like. Further, the system and method can be applied to materials other than photo paper, such as poster, folded card, canvas, cloth, T-shirt and the like.

What is claimed is:

1. A system for distributing consumer photograph-based advertisements and/or information, the system being implemented by at least one computer including at least one processor and comprising:
   a user information database accessible by a computer that stores a user's information and user's photograph;
   an advertisement database accessible by a computer that stores advertisement images and target audience criteria, allowing an advertiser to specify the target audience criteria, wherein the advertisement database includes an algorithm that selects advertisement images from the advertisement database based on the target audience criteria;
   a layout template database accessible by a computer that stores layout templates, each layout template including a user's photograph area and one or more advertisement image area;
   a layout template generator, implemented by the at least one processor, that selects a layout template from the layout template database for each user's photograph; and
   an image composition engine, implemented by the at least one processor, that combines the selected advertisement images with the user's photograph using the selected layout template to compose a new composed image, wherein the new composed image includes the user's photograph and the selected advertisement images, wherein each layout template has a different placement of the user's photograph and one or more advertising images so that the user cannot clip out the one or more advertising images with a single cut.

2. The system of claim 1, wherein the advertisement database uses a database query to select advertisement images, the database query incorporating the user's information and the target audience criteria to accurately select target audiences.

3. The system of claim 1, wherein the advertiser specifies the target audience criteria using a web-based target audience criteria tool.

4. The system of claim 1, wherein the layout template generator:
   translates a layout template selection rule into a database query to access the layout template database; and
   selects and retrieves the layout template from the layout template database based on the layout template selection rule.

5. The system of claim 1, wherein the layout template generator randomly selects the layout template.

6. The system of claim 1, further comprising a web-based result tracking tool that allows the advertiser to track a result of advertising by placing the advertiser's promotion code directly on each advertising image to be combined with the user's photograph.

7. The system of claim 6, wherein the web-based result tracking tool comprises statistics of geographical distribution of advertisement images sent.

8. The system of claim 6, wherein the web-based result tracking tool uses advertisement image barcodes to generate a barcode on the advertisement image to track the result of advertising.

9. The system of claim 1, further comprising a load balancing mechanism that distributes loads of servers that process the selected advertisement images and the user's photograph.

10. The system of claim 9, wherein the load balancing mechanism comprises:
    one or more data input packs, each data input pack including the selected layout template, the user's photograph, and the selected advertisement images;
    one or more image composition servers capable of processing the selected advertisement images and the user's photograph; and
    an image server dispatcher that assigns each data input pack to an image composition server queue based on an number of tasks each image composition server is processing.

11. The system of claim 1, further comprising a web-based accounting and payment system that allows the advertiser to pay the advertisement fee.

12. The system of claim 1, wherein the user uses a client platform to send a user request and upload the user's photograph into the user information database located on a central server platform by logging on and using web-based interfaces, wherein the user information is retrieved from the logging information and the user information database.

13. The system of claim 1, wherein the target audicncc criteria comprises one or more of demographic information, geographic information, purchase behavior information, product usage information, psychographies information, and a date range of an advertisement.

14. The system of claim 1, further comprising an interface for the user to specify preferences for an advertisement.

15. The system of claim 1, further comprising an interface for the user to specify preferences for a style of the new composed image.

16. The system of claim 1, further comprising an interface for a user to modify an information filter to specify information that the user is willing to release to the advertiser, wherein the information includes one or more of an email address, a phone number and a home address.

17. A method for distributing consumer photograph-based advertisements and/or information, the method being implemented by at least one computer including at least one processor and comprising:

storing a user's information and user's photograph in a user information database accessible by a computer;

storing advertisement images and target audience criteria in an advertisement database accessible by a computer, wherein the target audience criteria can be specified by an advertiser;

selecting, using the at least one processor, advertisement images from the advertisement database based on the target audience criteria;

storing layout templates in a layout template database accessible by a computer, each layout template including a user's photograph area and one or more advertisement image area;

selecting, using the at least one processor, a layout template from the layout template database for each user's photograph; and combining, using the at least one processor, the selected advertisement images with the user's photograph using the selected layout template to compose a new composed image, wherein the new composed image includes the user's photograph and the selected advertisement images, wherein each layout template has a different placement of the user's photograph and one or more advertising images so that the user cannot clip out the one or more advertising images with a single cut.

18. The method of claim 17, wherein the selecting advertisement images step comprises using a database query that incorporates the user's information and the target audience criteria to accurately select target audiences.

19. The method of claim 17, wherein the selecting a layout template step comprises:

translating a layout template selection rule into a database query to access the layout template database; and selecting and retrieving the layout template from the layout template database based on the layout template selection rule.

20. The method of claim 17, wherein the selecting a layout template step comprises randomly selecting the layout template.

21. The method of claim 17, further comprising using a web-based result tracking tool to track a result of advertising.

22. The method of claim 17, further comprising using a load balancing mechanism to distribute loads of servers that process the selected advertisement images and the user's photograph.

23. The method of claim 17, further comprising using a web-based accounting and payment system to allow the advertiser to pay an advertisement fee.

24. The method of claim 17, further comprising using a client platform to send a user request and uploading the user's photograph into the user information database located on a central server platform, wherein the user information is retrieved from a logging information and the user information database.

25. The method of claim 17, wherein the advertiser specifies the target audience criteria using a web-based target audience criteria tool.

26. The method of Claim 17, wherein the target audience criteria comprises one or more of demographic information, geographic information, purchase behavior information, product usage information, psychographics information, and a date range of an advertisement.

27. The method of claim 17, further comprising using an interface for the user to specify preferences for an advertisement.

28. The method of claim 17, further comprising using an interface for the user to specify preferences for a style of the new composed image.

29. The method of claim 17, further comprising using an interface for a user to specify information that the user is willing to release to the advertiser, wherein the information includes one or more of an email address, a phone number and a home address.

30. The method of claim 17, further comprising:

enabling a first user in a first country to upload the first user's photograph to a first server in the first country through the Internet; and generating a first new composed image based the first user's photograph, wherein the first new composed image includes the first user's photograph and selected advertisement images, wherein the first new composed image is delivered by a first postman of the first country to a domestic receiver.

31. The method of claim 17, further comprising:

enabling a first user in a first country to upload the first user's photograph to a second server in a second country through the international Internet; and generating a first new composed image based the first user's photograph, wherein the first new composed image includes the first user's photograph and selected advertisement images, wherein the first new composed image is delivered by a second postman of the second country to a receiver in the second country.

32. An automatic image composition system, comprising:

an advertisement image barcode system that generates a barcode on one or more selected advertisement images for an advertiser to track a result of advertising;

a layout generator that randomly selects a layout template to be used to combine a user's photograph and the one or more selected advertisement images to compose a new image; and an image composition engine that combines the advertisement image with the user's photograph using the randomly selected layout template to compose a new composed image, wherein the new composed image includes the user's photograph and the one or more selected advertisement image, wherein each layout template has a different placement of the user's photograph and one or more advertising images so that the user cannot clip out the one or more advertising images with a single cut.

33. A non-transitory, tangible computer readable medium providing instructions for distributing consumer photograph-based advertisements and information, the instructions comprising:

storing a user's information and user's photograph in a user information database;

storing advertisement images and target audience criteria in an advertisement database, wherein the target audience criteria can be specified by an advertiser;

selecting advertisement images from the advertisement database based on the target audience criteria;

storing layout templates in a layout template database, each layout template including a user's photograph area and one or more advertisement image area;

selecting a layout template from the layout template database for each user's photograph; and combining the selected advertisement images with the user's photograph using the selected layout template to compose a new composed image, wherein the new composed image includes the user's photograph and the selected advertisement images, wherein each layout template has a different placement of the user's photograph and one or more advertising images so that the user cannot clip out the one or more advertising images with a single cut.

* * * * *